(12) United States Patent
Dye

(10) Patent No.: US 7,578,229 B2
(45) Date of Patent: Aug. 25, 2009

(54) PISTON PRODUCED FROM A SINGLE FORGED OR CAST PISTON BLANK

(75) Inventor: Andrew Dye, Fort Wayne, IN (US)

(73) Assignee: Karl Schmidt Unisia, Inc., Marinette, WI (US)

( * ) Notice: Subject to any disclaimer, the term of this patent is extended or adjusted under 35 U.S.C. 154(b) by 299 days.

(21) Appl. No.: 11/607,174

(22) Filed: Dec. 1, 2006

(65) Prior Publication Data

US 2008/0127818 A1    Jun. 5, 2008

(51) Int. Cl.
*F01B 31/08* (2006.01)
*B23P 15/10* (2006.01)
*F16J 1/04* (2006.01)

(52) U.S. Cl. .................. 92/186; 92/231; 29/888.042
(58) Field of Classification Search .............. 92/186, 92/208, 231, 260; 29/888.04, 888.042, 888.044
See application file for complete search history.

(56) References Cited

U.S. PATENT DOCUMENTS

| 3,465,651 A | 9/1969 | Tromel |
| 3,613,521 A | 10/1971 | Itano |
| 4,581,983 A | 4/1986 | Moebus |
| 5,065,508 A | 11/1991 | Lorento et al. |
| 5,309,818 A | 5/1994 | Mendes et al. |
| 6,279,455 B1 | 8/2001 | Kruse |
| 6,477,941 B1 * | 11/2002 | Zhu et al. ............. 92/186 |
| 6,491,013 B1 * | 12/2002 | Gaiser et al. .......... 92/186 |
| 6,526,871 B1 * | 3/2003 | Zhu et al. ............. 92/231 |
| 6,588,320 B2 * | 7/2003 | Gaiser et al. .......... 92/231 |
| 6,651,549 B2 | 11/2003 | Zhu et al. |
| 6,840,155 B2 * | 1/2005 | Ribeiro et al. ......... 92/186 |
| 6,862,976 B2 * | 3/2005 | Gaiser et al. .......... 92/186 |
| 7,104,183 B2 | 9/2006 | Huang |

* cited by examiner

*Primary Examiner*—Michael Leslie
(74) *Attorney, Agent, or Firm*—Butzel Long

(57) ABSTRACT

A piston and method of making a piston which involves providing a single piece piston blank that, after casting or forging, is separated into separate upper and lower portions. The upper portion is machined to develop a piston head having that includes a cooling gallery portion and the lower portion is machined to develop a piston body having a cooling gallery portion, a skirt and a pair of opposed pin bores. After machining the piston head and piston body are attached together and the resulting assembly is machine finished into a finished piston.

13 Claims, 4 Drawing Sheets

PISTON PRODUCED FROM A SINGLE FORGED OR CAST PISTON BLANK

TECHNICAL FIELD

The present invention relates to pistons for internal combustion engines that comprise separately machined head and body portions that, after being separately machined, are attached together to form integrated pistons. More particularly, the present invention is directed to a method of making integrated pistons that utilizes a single integrally forged or cast piston blank that is subsequently machined into separate head and body portions and reattached together.

BACKGROUND ART

It is known in the art of pistons to manufacture integrated pistons from separate head and body portions that are subsequently coupled together in some fashion. Examples of earlier designs that mechanically coupled piston head and body portions together by such means as bolts, threaded studs, etc. can be found in U.S. Pat. No. 4,532,686 to Berchem, U.S. Pat. No. 4,517,930 to Nakano et al, and U.S. Pat. No. 3,877,351 to Barfiss. More current piston designs that are exemplified by U.S. Pat. No. 5,309,818 to Mendes et al. and U.S. Pat. No. 6,651,549 to Zhu et al. rely upon welding piston head and body portions together.

To date, the head and body portions of pistons have been separately forged or cast into piston blanks that are separately machined before being coupled together. This process requires the development of two separate dies or molds and produces a significant amount of waste, as typically the volume of metal used to produce each piston blank has to be quite a bit greater than the actual volume of the blank to compensate for the die or mold design.

The present invention provides a method of making integrated pistons that utilizes a single integrally forged or cast piston blank that is subsequently machined into separate head and body portions.

DISCLOSURE OF THE INVENTION

According to various features, characteristics and embodiments of the present invention which will become apparent as the description thereof proceeds, the present invention provides a method of producing a piston which involves the steps of:

a) forging or casting a single piston blank having an upper portion and a lower portion;

b) separating the upper portion and lower portion of the piston blank from one another;

c) separately machining the upper portion of the piston blank to form a piston head and the lower portion of the piston blank to form a piston body;

d) attaching the piston head to the piston body to form an integrated piston; and e) finishing the resulting integrated piston.

The present invention further provides a forged or cast single piece piston blank that includes:

an upper portion that is configured to be machined into a piston head having a cooling gallery portion and a crown;

a lower portion that is configured to be machined into a piston body having a cooling gallery portion, a skirt and a pair of opposed pin bores; and an area between the upper portion and the lower portion where the upper and lower portion can be separated for purposes of separately machining the upper portion into a piston head having a cooling gallery portion and a crown and machining the lower portion into a piston body having a cooling gallery portion, a skirt and a pair of opposed pin bores.

The present invention also provides a piston which includes:

a piston head that has been machined to have a cooling gallery and a crown; and a piston body that has been machined to have a skirt and a pair of opposed pin bores, wherein the piston head and the piston body have been separately machined and attached together after said separate machining and wherein the piston head and piston body are derived from a single common forged or cast piston blank so that the material properties of the piston head and the piston body are consistent.

BRIEF DESCRIPTION OF DRAWINGS

The present invention will be described with reference to the attached drawings which are given as non-limiting examples only, in which.

BEST MODE FOR CARRYING OUT THE INVENTION

The present invention is directed to a method of making integrated pistons that utilizes a single integrally forged or cast piston blank that is subsequently machined into separate head and body portions. Reference herein to forged and cast piston blanks and the use of dies or molds has been made to indicate that the principles of the present invention are applicable to piston blanks that are produced according to any known methods.

According to the present invention a single integrally forged or cast piston blank is produced and subsequently separated into upper and lower head and body portions that are separately machined and then attached together. In this regard, the design of the piston blank is quite different from prior art processes that involve the use of separate forgings or castings for the head and body portions of integrated pistons. In the present invention the piston blank is configured to have an upper portion that can be separated from the lower portion to produce separate head and body portions which heretofore the prior art has produced using separate forgings or castings.

The use of a single die or mold according to the present invention reduces tooling costs of the forging or casting, since only a single forging die or casting mold is required for producing the piston blanks. This reduces the die or mold material required as well as die or mold design time. As a result of reducing the die or mold design time, the time required to obtain parts can be significantly reduced. Further, the use of a single forging or casting allows the total material used for the manufacturing process to be reduced. In addition, the extra stock needed to fill the die or mold is consolidated into one forging or casting, thus reducing waste and optimizing cost. The design of the single piece forging or casting aids in the forgability or moldability of the piston blank. This will help optimize the life of the forging die or casting mold and further reduce costs. Further, the material properties through the top and bottom portions of the forging or casting will also be more consistent than with two separate pieces.

Figure 1:
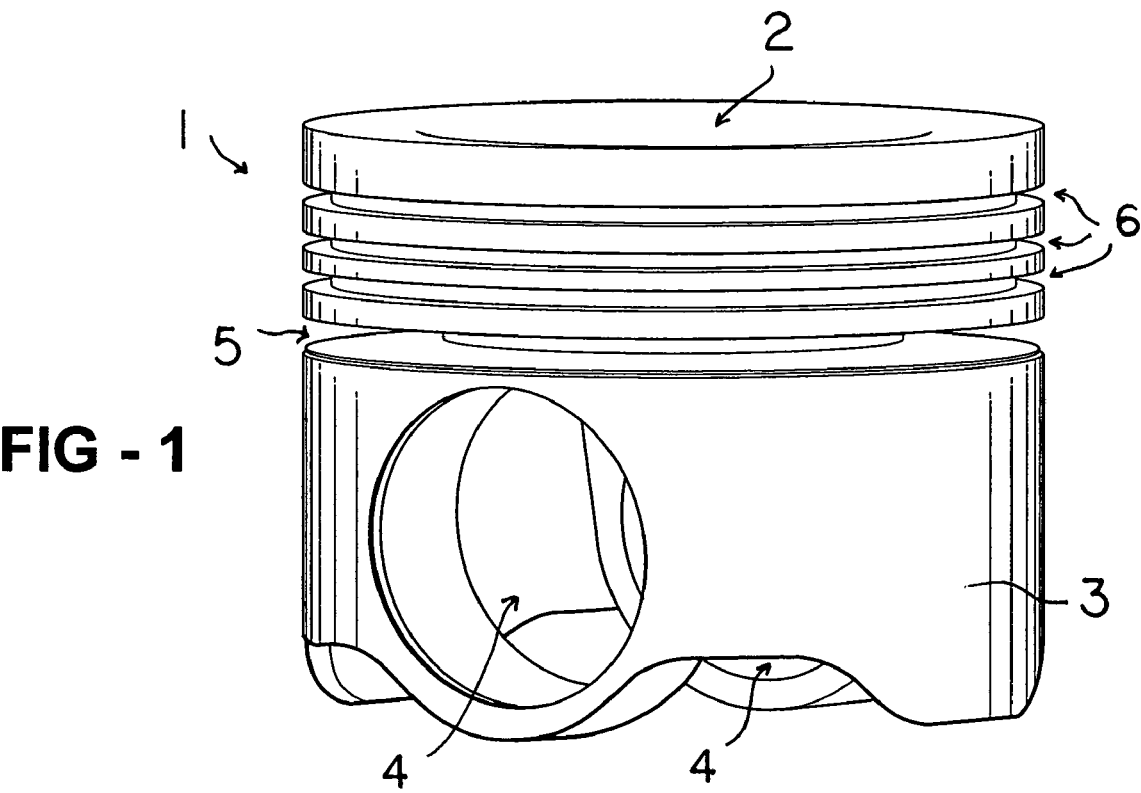
FIG. 1 is a perspective view of a piston according to one embodiment of the present invention.

FIG. 1 is a perspective view of a piston according to one embodiment of the present invention. The piston shown in FIG. 1 includes a head portion 1 having bowl-shaped crown 2, a skirt 3 that extends downward from the head portion 1, a pair of opposed pin bores 4 formed in the skirt 3, an open cooling gallery 5 (See also FIG. 7) and a plurality of grooves 6 for receiving piston rings, including one or more compression rings and an oil ring in a known manner.

Whereas FIG. 1 depicts a conventional piston design, having known structural elements, it is to be understood that the present invention is not limited in any means to a particular piston design, as will be understood as the description thereof proceeds.

Figure 2:
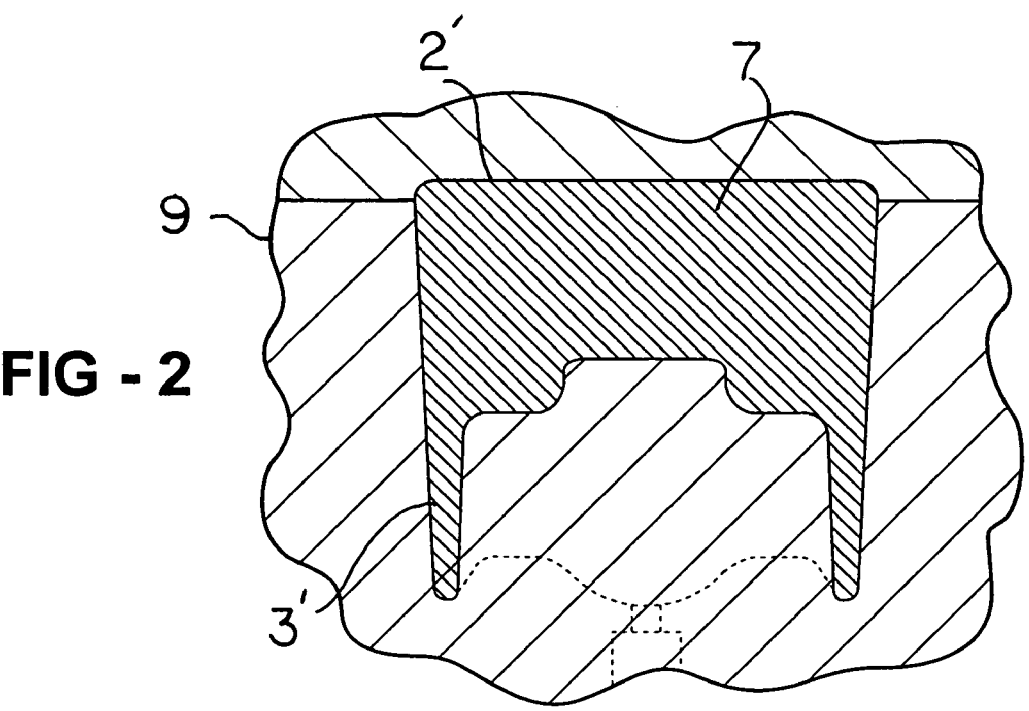
FIG. 2 is a cross-sectional view of a piston blank produced within a die or mold according to one embodiment of the present invention.

FIG. 2 is a cross-sectional view of a piston blank produced within a die or mold according to one embodiment of the present invention. The piston blank 7 includes the required geometry for the bottom skirt portion 3' and for the upper crown portion 2'. That is, the geometry for each of the bottom skirt portion 3' and the upper crown portion 2' include sufficient dimensions to allow material to be removed during the machining processes discussed below to form the skirt 3 and bowl-shaped crown 2 shown in FIG. 1. The machining processes includes separate pre-machining processes that are applied to the upper and lower portions of the piston blank (or head and body portions) and subsequent final machining of the piston after the pre-machined upper and lower portions of the piston blank (or head and body portions) are attached together.

As can be generally seen in FIG. 2, the upper crown portion 2' has a general cylindrical shape and the bottom skirt portion 3' has an annular shape. The structure of the die or mold 9 depicted in FIG. 2, including any material injection structure or any ejector structure is non-limiting as a single integrally forged or cast piston blank for purposes of the present invention can be produced using a variety of die and mold designs.

Figure 3:
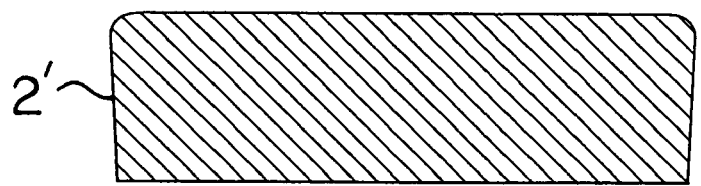
FIG. 3 is a cross-sectional view illustrating how a single piece piston blank is separated into separate top and bottom portions for subsequent machining of each portion according to one embodiment of the present invention.
Figure 3:
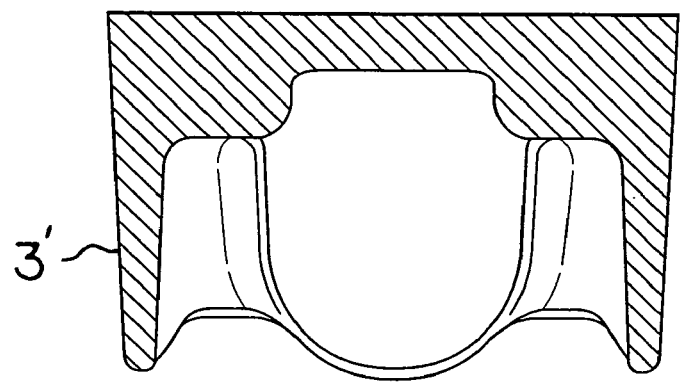

FIG. 3 is a cross-sectional view illustrating how a single piece piston blank is separated into separate top and bottom portions for subsequent machining of each portion. After the piston blank depicted in FIG. 2 is removed from the die or mold and cooled sufficiently, the upper crown portion 2' is separated from bottom skirt portion 3'. The separation of the upper crown portion 2' from bottom skirt portion 3' can be accomplished by any convenient means, including sawing, mechanically cutting, laser cutting, etc.

Figure 4:
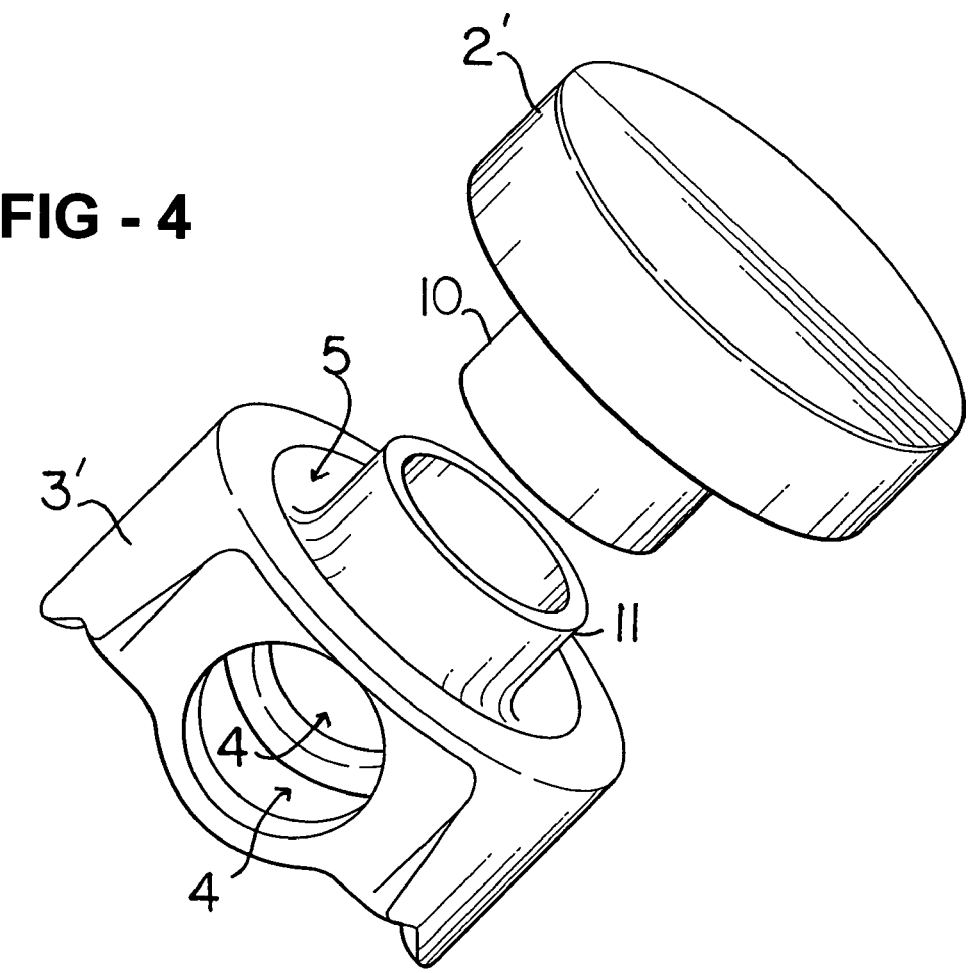
FIG. 4 is a perspective illustration of how the machined top and bottom portions of a piston blank are shaped, according to one embodiment of the present invention, prior to being attached together.
Figure 5:
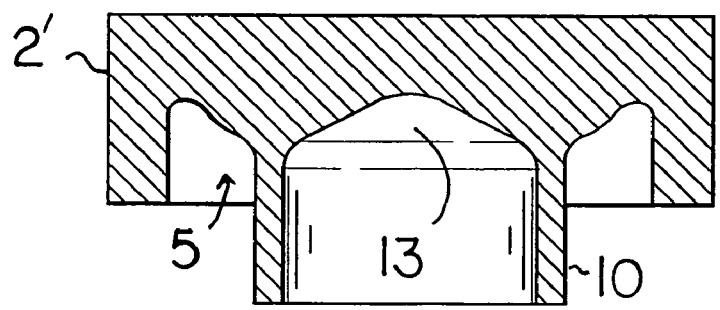
FIG. 5 a cross-sectional view that is similar to FIG. 4.

FIG. 4 is a perspective illustration of how the machined top and bottom portions of a piston blank are shaped prior to being attached together according to one embodiment of the present invention. FIG. 5 a cross-sectional view that is similar to FIG. 4. FIGS. 4 and 5 depicted how the upper crown portion 2' (or head portion) and bottom skirt portion 3' (or body portion) of the piston blank have been pre-machined. As depicted, the upper crown portion 2' (or head portion) of the piston blank has been machined to include a cooling gallery portion 5 and an inner annular wall 10 by which the upper crown portion 2' (or head portion) will be attached to the bottom skirt portion 3' (or body portion). In addition, the top of the upper crown portion 2' (or head portion) of the piston blank has been machined so as to be more clearly defined.

As further depicted in FIGS. 4 and 5, the bottom skirt portion 3' (or body portion) of the piston blank has been machined to include an inner annular wall 11 by which the upper crown portion 2' (or head portion) will be attached to the bottom skirt portion 3' (or body portion). The bottom skirt portion 3' (or body portion) of the piston blank has further been machined to include a lower portion of the cooling gallery portion 5, including an oil injection port 12, and opposed pin bores 4. In addition, the bottom skirt portion 3' (or body portion) of the piston blank has been machined to more clearly define the piston skirt 3 and the area 13 that will be below the final crown of the piston has been machined out to reduce overall weight of the final piston.

It is noted that the pre-machining of the upper crown portion 2' (or head portion) and bottom skirt portion 3' (or body portion) of the piston blank can be accomplished using any known and conventional machining techniques. Moreover, it is to be understood that the shape of the piston blank according to the present invention is not limited to that depicted in FIG. 4. That is, the piston blank can have any desired shape that provides sufficient dimensions from which to machine the structural features of the final piston.

Figure 6:
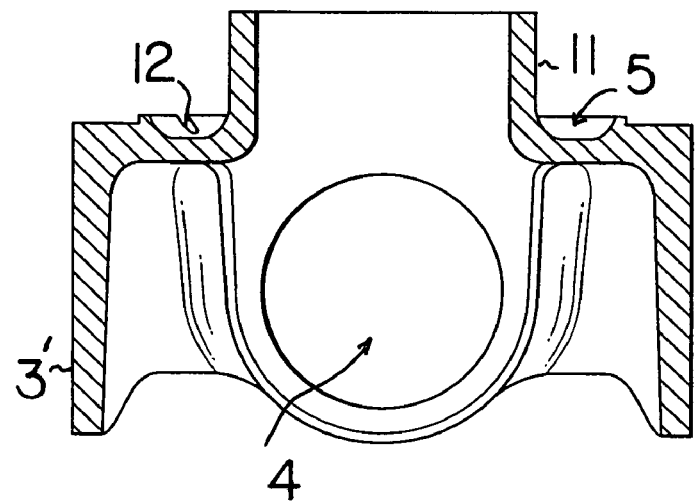
FIG. 6 is a cross-sectional view that illustrates how the machined top and bottom portions of a piston blank are attached together according to one embodiment of the present invention.

FIG. 6 is a cross-sectional view that illustrates how the machined top and bottom portions of a piston blank are attached together according to one embodiment of the present invention.

As depicted in FIG. 6, one method of attaching the pre-machined upper crown portion 2' (or head portion) and bottom skirt portion 3' (or body portion) together is to align the inner annular wall 10 of the upper crown portion 2' (or head portion) with the inner annular wall 11 of the bottom skirt portion 3' (or body portion) and create a friction weld by pressing the inner annular walls 10 and 11 together while providing relative rotation of the upper crown portion 2' (or head portion) and bottom skirt portion 3' (or body portion) (as indicated by arrows "a" and "b"). The combination of pressure and relative rotational movement between the upper crown portion 2' (or head portion) and bottom skirt portion 3' (or body portion) will create sufficient heat to weld the upper crown portion 2' (or head portion) and bottom skirt portion 3' (or body portion) together.

In alternative embodiments, the upper crown portion 2' (or head portion) and bottom skirt portion 3' (or body portion) could be welded or brazed or attached together by processes other than friction welding. In this regard, the intersection of the inner annular walls 10 and 11 can be accessed from within the bottom of the piston and/or through the cooling gallery 5 for welding, brazing, etc. the inner annular walls 10 and 11 together using other techniques. It is also within the scope of the present invention to attach the upper crown portion 2' (or head portion) and bottom skirt portion 3' (or body portion) together with mechanical means.

Figure 7:
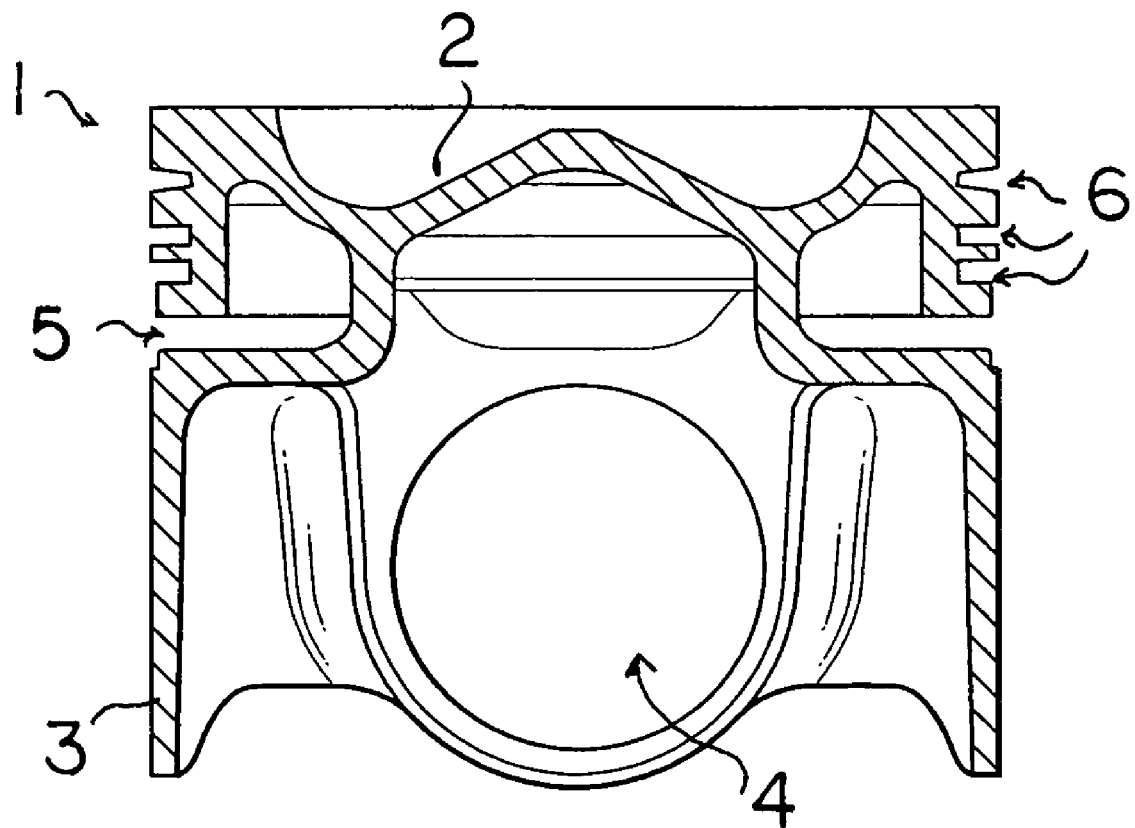
FIG. 7 is a cross-sectional view of a finished piston produced according to the present invention.

FIG. 7 is a cross-sectional view of a finished piston produced according to the present invention. As shown in FIG. 7, after the upper crown portion 2' (or head portion) and bottom skirt portion 3' (or body portion) are attached together the resulting piston structure can be subjected to machining processes that form bowl bowl-shaped crown 2, and plurality of grooves 6 for receiving piston rings, including one or more compression rings and an oil ring in a known manner.

The pistons of the present invention can be made from any known material appropriate for piston structures and any know material such as steel that is suitable for friction welding when the upper crown portion 2' (or head portion) and bottom skirt portion 3' (or body portion) are attached together by friction welding techniques. When other means are used to attach the upper crown portion 2' (or head portion) and bottom skirt portion 3' (or body portion), other suitable materials can be used to forge or cast the piston blank. In general, the pistons of the present invention can be made from any known material such as steel, aluminum or other metal alloys that are appropriate for piston structures.

The pistons of the present invention can be used in various internal combustion engines, including light and heavy duty gasoline and diesel engines. It is also possible to form pistons that have closed cooling galleries or semi-open cooling galleries.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the appended claims.

What is claimed is:

1. A method of producing a piston which comprises the steps of:
    a) forging or casting a single piston blank having an upper portion and a lower portion;
    b) separating the upper portion and lower portion of the piston blank from one another;
    c) separately machining the upper portion of the piston blank to form a piston head and the lower portion of the piston blank to form a piston body;
    d) attaching the piston head to the piston body to form an integrated piston; and
    e) finishing the resulting integrated piston.

2. A method of producing a piston according to claim 1, wherein step c) comprises forming a cooling gallery portion in the upper portion of the piston blank.

3. A method of producing a piston according to claim 2, wherein step c) comprises forming a cooling gallery portion in the lower portion of the piston blank.

4. A method of producing a piston according to claim 1, wherein step d) comprises welding the piston head to the piston body.

5. A method of producing a piston according to claim 4, wherein step d) comprises friction welding the piston head to the piston body.

6. A method of producing a piston according to claim 1, wherein step e) comprises forming a bowl-shaped crown in the piston head.

7. A method of producing a piston according to claim 1, wherein step e) comprises forming piston ring grooves in an outer surface of the piston head.

8. A method of producing a piston according to claim 1, wherein the piston blank is made from steel.

9. A piston which comprises:
    a piston head that has been machined to have a cooling gallery and a crown; and
    a piston body that has been machined to have a skirt and a pair of opposed pin bores,
    wherein the piston head and the piston body are obtained from a forged or cast single common piston blank that has been separated into an upper portion that has been separately machined to form the piston head and a lower portion that has been separately machined to form the piston body, the piston head and the piston body having been attached together after said separate machining so that the material properties, including the metallurgical composition of the piston head and the piston body are substantially indistinguishable.

10. A piston according to claim 9, wherein the piston head and piston body are welded together about an annular connection.

11. A piston according to claim 9, wherein a cooling gallery is formed in the piston head.

12. A piston according to claim 9, wherein a cooling gallery is formed in the piston body.

13. A piston according to claim 9, wherein the piston head and piston body are made from steel.

* * * * *